United States Patent
Zhang et al.

(10) Patent No.: US 10,361,748 B2
(45) Date of Patent: Jul. 23, 2019

(54) MULTI-STAGE ECHO CANCELATION SCHEME TO RUN FDX IN COAX CABLE PLANT

(71) Applicant: Futurewei Technologies, Inc., Plano, TX (US)

(72) Inventors: Xiaolong Zhang, Wuhan (CN); Fan Wang, Wuhan (CN); Tao Ouyang, Wuhan (CN); Li Zhang, Wuhan (CN); James Jeng Chen, Corona, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/871,485

(22) Filed: Jan. 15, 2018

(65) Prior Publication Data

US 2018/0219577 A1 Aug. 2, 2018

Related U.S. Application Data

(60) Provisional application No. 62/446,697, filed on Jan. 16, 2017.

(51) Int. Cl.
*H04B 3/20* (2006.01)
*H04B 3/493* (2015.01)

(52) U.S. Cl.
CPC .............. *H04B 3/20* (2013.01); *H04B 3/493* (2015.01)

(58) Field of Classification Search
CPC .................................. H04B 3/20; H04B 3/493
See application file for complete search history.

(56) References Cited

U.S. PATENT DOCUMENTS

| | | | | |
|---|---|---|---|---|
| 6,421,377 B1* | 7/2002 | Langberg | ................. | H04B 3/23 370/286 |
| 7,747,002 B1* | 6/2010 | Thi | .......................... | H04B 3/23 379/406.08 |
| 8,509,125 B1* | 8/2013 | Venkataraman | ......... | H04B 3/20 370/285 |
| 9,942,125 B1* | 4/2018 | Sedarat | .................... | H04L 43/50 |
| 2004/0019443 A1* | 1/2004 | Jones | ..................... | H04L 43/50 702/79 |

(Continued)

FOREIGN PATENT DOCUMENTS

| CN | 1819608 A | 8/2006 |
|---|---|---|
| CN | 105591667 A | 5/2016 |
| WO | 0163786 A1 | 8/2001 |

OTHER PUBLICATIONS

Machine Translation and Abstract of Chinese Publication No. CN1819608, Aug. 16, 2006, 9 pages.

(Continued)

*Primary Examiner* — Jaison Joseph
(74) *Attorney, Agent, or Firm* — Conley Rose, P.C.

(57) ABSTRACT

Disclosed herein is a multi-stage echo cancellation scheme. The disclosed embodiments include an apparatus and method for monitoring and canceling echoes greater than 25 dB in a coaxial cable plant. The method includes obtaining echo channel estimate coefficients from a cable node. The method determines a location and strength of each partial echo in an impulse response using the echo channel estimate coefficients. Optionally, the method determines a frequency response of each partial echo in the impulse response.

23 Claims, 7 Drawing Sheets

(56) References Cited

U.S. PATENT DOCUMENTS

| | | | | |
|---|---|---|---|---|
| 2007/0064824 | A1* | 3/2007 | Wang ................ | H04L 25/03006 |
| | | | | 375/260 |
| 2010/0191525 | A1* | 7/2010 | Rabenko ................. | H04B 3/23 |
| | | | | 704/211 |
| 2014/0334631 | A1* | 11/2014 | de Vicente Pena .... | G10K 11/16 |
| | | | | 381/71.1 |
| 2015/0043626 | A1* | 2/2015 | Williams ................ | H04B 3/46 |
| | | | | 375/227 |

OTHER PUBLICATIONS

Machine Translation and Abstract of Chinese Publication No. CN105591667, May 18, 2016, 5 pages.

Foreign Communication From a Counterpart Application, PCT Application No. PCT/CN2018/072786, English Translation of International Search Report dated Apr. 18, 2018, 8 pages.

Foreign Communication From a Counterpart Application, PCT Application No. PCT/CN2018/072786, English Translation of Written Opinion dated Apr. 18, 2018, 6 pages.

* cited by examiner

MULTI-STAGE ECHO CANCELATION SCHEME TO RUN FDX IN COAX CABLE PLANT

CROSS-REFERENCE TO RELATED APPLICATIONS

This application claims priority to U.S. provisional patent application No. 62/446,697 filed on Jan. 16, 2017 titled "Method and Apparatus of Applying a Multi-Stage Echo Cancellation Scheme to Run a Full-Duplex System in a Coaxial Cable Plant," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are many impedance mismatch points in a coax cable plant, such as bad or rusted connectors, damaged cables, short connecting ports, open connecting ports, etc. Echoes occur when signals pass through these mismatch points. Echoes are reflections caused by impedance mismatches. In the echo, there are two parts, one part is the signal and the second part is the noise. If the echo is serious, both the signal and the noise in the echo will interfere with the upstream signal. Therefore, the echo should be canceled.

Current echo cancellers have limited echo noise cancellation. Current echo cancellers are incapable of canceling the very high echo noise floor at higher frequencies.

SUMMARY

According to one aspect of the present disclosure, there is provided a computer implemented method performed by a node for monitoring echoes in a coaxial cable plant. In one embodiment, the method includes obtaining echo channel (EC) estimate coefficients from a cable node. The method includes determining a location and strength of each partial echo in an impulse response using the EC estimate coefficients. Optionally, the method determines a frequency response of each partial echo in the impulse response.

Optionally, in the preceding aspects, the method may transform the EC estimate coefficients from frequency domain to time domain. Optionally, in the preceding aspects, the method may transform the EC estimate coefficients from frequency domain to time domain to generate the impulse response. Optionally, in the preceding aspects, the method may transform the EC estimate coefficients from frequency domain to time domain to generate the impulse response using an Inverse Discrete Fourier Transform (IDFT). Optionally, in the preceding aspects, the method may transform the EC estimate coefficients from frequency domain to time domain to generate the impulse response using an Inverse Fast Fourier Transform (IFFT).

According to a second aspect of the present disclosure, an echo canceller is disclosed for canceling a downstream echo signal from a contaminated upstream signal. The downstream echo signal includes a downstream signal portion and a downstream noise signal portion. In one embodiment, the echo canceller includes a downstream interface configured to receive a downstream digital signal (DDS) and forward the DDS along a downstream signal path. A first digital-to-analog converter (DAC1) receives the DDS, and converts the DDS to a downstream analog signal (DAS). A power amplifier (PA) coupled to the DAC1 receives the DAS, and amplifies the DAS to generate an amplified downstream analog signal (ADAS). The ADAS includes the DAS and a downstream analog noise signal. An echo canceller control (ECC) is coupled to the downstream signal path and receives the DDS. A first digital echo canceller (H1) is coupled to the ECC. H1 receives equalization estimate coefficients and the DDS from the ECC. H1 produces a first digital cancellation signal for canceling the downstream signal portion of the downstream echo signal from a first contaminated analog upstream signal. A second digital-to-analog converter (DAC2) is coupled to H1. DAC2 receives the first digital cancellation signal, and converts the first digital cancellation signal to a first analog cancellation signal for canceling the downstream signal portion of the downstream echo signal from the first contaminated analog upstream signal. An upstream interface receives the first contaminated analog upstream signal, and forwards the first contaminated analog upstream signal along an upstream signal path. The first contaminated analog upstream signal includes an upstream signal and the downstream echo signal. A first signal subtraction unit along the upstream signal path receives the first contaminated analog upstream signal and the first analog cancellation signal. The first signal subtraction unit removes the downstream signal portion of the downstream echo signal from the first contaminated analog upstream signal using the first analog cancellation signal to generate a second contaminated analog upstream signal. The second contaminated analog upstream signal includes the upstream signal and the downstream noise signal portion of the downstream echo signal. A first analog-to-digital converter (ADC1) along the upstream signal path receives the second contaminated analog upstream signal. The ADC1 converts the second contaminated analog upstream signal to a contaminated digital upstream signal that includes the upstream signal and the downstream noise signal portion of the downstream echo signal. An analog echo canceller (H3) coupled to the ECC receives the equalization estimate coefficients and the DDS from the ECC. The H3 produces a third digital cancellation signal for canceling the downstream signal portion of the ADAS. A third digital-to-analog converter (DAC3) coupled to the H3 receives the third digital cancellation signal. The DAC3 converts the third digital cancellation signal to a third analog cancellation signal for canceling the DAS from the ADAS. A second signal subtraction unit coupled to the DAC3 receives the ADAS and the third analog cancellation signal. The second signal subtraction unit removes the DAS from the ADAS using the third analog cancellation signal to generate the downstream analog noise signal. A second analog-to-digital converter (ADC2) coupled to the second signal subtraction unit receives the downstream analog noise signal, and converts the downstream analog noise signal to a downstream digital noise signal. A second digital echo canceller (H2) coupled to the ADC2 receives the downstream digital noise signal from the ADC2, the H2 produces a second digital cancellation signal for canceling the downstream noise signal portion of the downstream echo from the contaminated digital upstream signal. A third signal subtraction unit coupled to the H2 receives the second digital cancellation signal. The third signal subtraction unit removes the downstream noise signal portion of the downstream echo from the contaminated digital upstream signal to generate the upstream signal.

According to a third aspect of the present disclosure, an echo canceller for canceling a downstream echo signal from a contaminated upstream signal is disclosed herein. The downstream echo signal includes a downstream signal portion and a downstream noise signal portion. In one embodiment, the echo canceller includes a downstream interface configured to receive a DDS and forward the DDS along a downstream signal path. A DAC1 coupled to the downstream interface via the downstream signal path receives the DDS. The DAC1 converts the DDS to a DAS. A PA coupled to the DAC1 receives the DAS. The PA amplifies the DAS to generate an ADAS. The ADAS includes the DAS and a downstream analog noise signal. An ECC coupled to the downstream signal path receives the DDS. A H1 coupled to the ECC receives equalization estimate coefficients and the DDS from the ECC. The H1 produces a first digital cancellation signal for canceling the downstream signal portion of the downstream echo signal from a first contaminated analog upstream signal. A DAC2 coupled to the H1 receives the first digital cancellation signal. The DAC2 converts the first digital cancellation signal to a first analog cancellation signal for canceling the downstream signal portion of the downstream echo signal from the first contaminated analog upstream signal. An upstream interface receives the first contaminated analog upstream signal and forwards the first contaminated analog upstream signal along an upstream signal path. The first contaminated analog upstream signal includes an upstream signal and the downstream echo signal. A first signal subtraction unit along the upstream signal path receives the first contaminated analog upstream signal and the first analog cancellation signal. The first signal subtraction unit removes the downstream signal portion of the downstream echo signal from the first contaminated analog upstream signal using the first analog cancellation signal to generate a second contaminated analog upstream signal. The second contaminated analog upstream signal includes the upstream signal and the downstream noise signal portion of the downstream echo signal. An ADC1 along the upstream signal path receives the second contaminated analog upstream signal. The ADC1 converts the second contaminated analog upstream signal to a contaminated digital upstream signal. The contaminated digital upstream signal includes the upstream signal and the downstream noise signal portion of the downstream echo signal. An H3 coupled to the ECC receives the equalization estimate coefficients and the DAS. The H3 produces an analog downstream cancellation signal for canceling the DAS of the ADAS. A second signal subtraction unit receives the ADAS and the analog downstream cancellation signal. The second signal subtraction unit removes the DAS from the ADAS using the analog downstream cancellation signal to generate the downstream analog noise signal. An ADC2 coupled to the second signal subtraction unit receives the downstream analog noise signal and converts the downstream analog noise signal to a downstream digital noise signal. A H2 coupled to the ADC2 receives the downstream digital noise signal from the ADC2. The H2 produces a second digital cancellation signal for canceling the downstream noise signal portion of the downstream echo from the contaminated digital upstream signal. A third signal subtraction unit coupled to the H2 receives the second digital cancellation signal. The third signal subtraction unit removes the downstream noise signal portion of the downstream echo from the contaminated digital upstream signal to generate the upstream signal.

According to a fourth aspect of the present disclosure, an echo canceller is configured to cancel a downstream echo signal from a contaminated upstream signal. In one embodiment, the echo canceller includes a downstream noise canceling circuit path comprising a DAC1, a first signal subtraction unit (S1), and an ADC1. The DAC1 generates an analog downstream signal. The S1 subtracts the analog downstream signal from a downstream reference signal to generate an analog downstream noise signal. The ADC1 converts the analog downstream noise signal to a digital downstream noise signal. In one aspect, the echo canceller includes a downstream signal canceling circuit path that includes a DAC2, a second signal subtraction unit (S2), an ADC2, and a third signal subtraction unit (S3). The DAC2 generates a second analog downstream signal. The S2 removes a downstream signal portion of a downstream echo signal from a first contaminated analog upstream signal using the second analog downstream signal to generate a second contaminated analog upstream signal. The second contaminated analog upstream signal includes an upstream signal and a downstream noise signal portion of a downstream echo signal. The ADC2 converts the second contaminated analog upstream signal to a contaminated digital upstream signal that includes the upstream signal and the downstream noise signal portion of the downstream echo signal. The S3 receives the digital downstream noise signal and the contaminated digital upstream signal. The S3 removes the downstream noise signal portion of the downstream echo signal from the contaminated digital upstream signal using the digital downstream noise signal to generate the upstream signal.

According to a fifth aspect of the present disclosure, an echo canceller is configured to cancel a downstream echo signal from a contaminated upstream signal. The echo canceller includes a downstream noise canceling circuit path that includes an H3, a S1, and an ADC1. The H3 produces an analog downstream cancellation signal for canceling a DAS from a downstream reference signal. The downstream reference signal includes the downstream reference signal and a downstream noise signal. The S1 receives the downstream reference signal and the analog downstream cancellation signal. The S1 removes the DAS from the downstream reference signal using the analog downstream cancellation signal to generate a downstream analog noise cancellation signal. The ADC1 converts the downstream analog noise cancellation signal to a downstream digital noise cancellation signal. In one aspect, the echo canceller includes a downstream signal canceling circuit path comprising a DAC, a S2, an ADC2, and a S3. The DAC generates a second analog downstream cancellation signal for canceling the DAS from a first contaminated analog upstream signal comprising an upstream signal and the downstream echo signal. The S2 removes a downstream signal portion of the downstream echo signal from the first contaminated analog upstream signal using the second analog downstream cancellation signal to generate a second contaminated analog upstream signal that includes the upstream signal and a downstream noise signal portion of the downstream echo signal. The ADC2 converts the second contaminated analog upstream signal to a contaminated digital upstream signal that includes the upstream signal and the downstream noise signal portion of the downstream echo signal. The S3 receives the downstream digital noise cancellation signal and the contaminated digital upstream signal. The S3 removes the downstream noise signal portion of the downstream echo signal from the contaminated digital upstream signal using the downstream digital noise cancellation signal to generate the upstream signal.

According to a sixth aspect of the present disclosure, an echo canceller is configured to cancel a downstream echo signal from a contaminated upstream signal. The contaminated upstream signal includes an upstream signal and a downstream echo signal. The downstream echo signal comprising a downstream signal portion and a downstream noise signal portion. The echo canceller includes a first echo canceller configured to receive a downstream signal received by the echo canceller and produce a first cancellation signal from the downstream signal. A first subtractor is configured to receive the contaminated upstream signal and receive the first cancellation signal from the first echo canceller. The first subtractor is configured to remove the downstream signal portion of the downstream echo signal from the contaminated upstream signal using the first cancellation signal, generating an upstream noise signal comprising the upstream signal and the downstream noise signal portion of the downstream echo signal. A third echo canceller is configured to receive the downstream signal and produce a third cancellation signal from the downstream signal. A third subtractor is configured to receive the third cancellation signal from the third echo canceller and receive a contaminated downstream signal that includes the downstream signal and a downstream noise signal. The third subtractor is configured to remove the downstream signal from the contaminated downstream signal using the third cancellation signal, generating a downstream noise signal.

A second echo canceller is configured to receive the downstream noise signal from the third subtractor. The second echo canceller is configured to produce a second cancellation signal from the downstream noise signal for canceling the downstream noise signal portion of the downstream echo signal. A second subtractor is configured to receive the second cancellation signal from the second echo canceller and receive the upstream noise signal from the first subtractor. The second subtractor is configured to remove the downstream noise signal portion of the downstream echo signal from the upstream noise signal using the second cancellation signal to produce the upstream signal.

The above aspects and other aspects as well as the advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
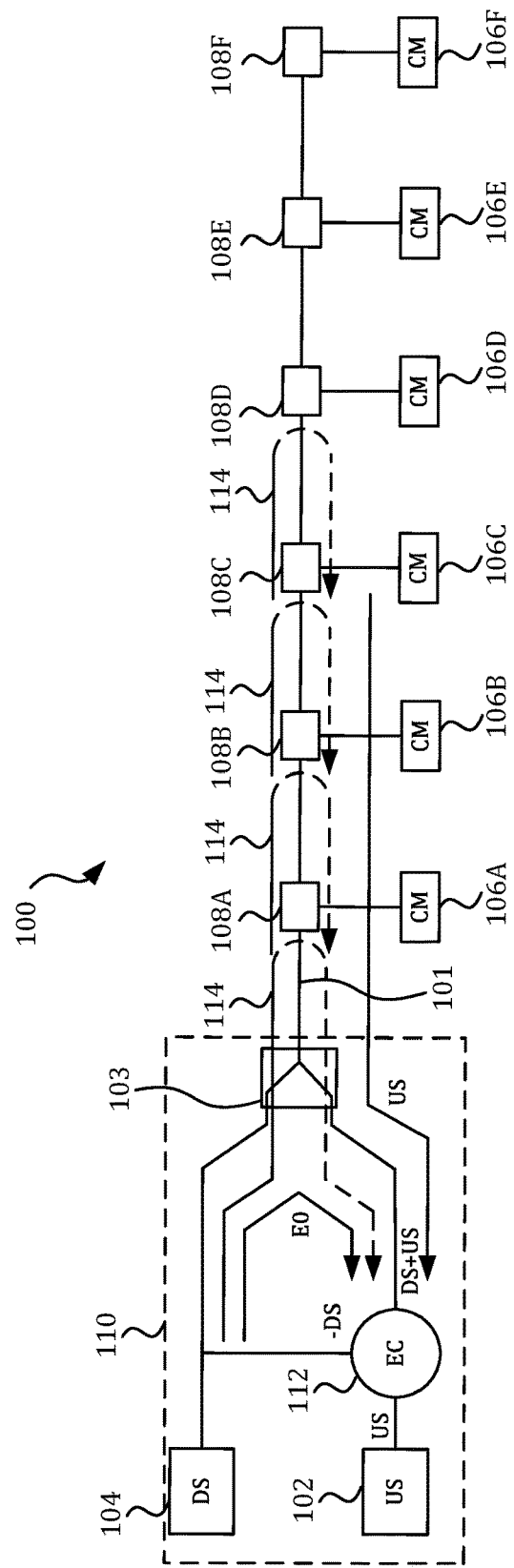
FIG. 1 is a schematic diagram illustrating a Full Duplex (FDX) Data over Cable Service Interface Specification (DOCSIS) system in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module as referenced herein may comprise one or more hardware or electrical components such as electrical circuitry, processors, and memory. The memory may be volatile memory or non-volatile memory that stores data such as, but not limited to, computer executable instructions, machine code, and other various forms of data. The module may be configured to use the data to execute one or more instructions to perform one or more tasks.

Data traffic can be carried over a single communications line (link or channel) in two directions simultaneously in full duplex system (FDX). Upstream and downstream data traffic can be sent bi-directionally at the same frequency. In a coaxial (coax) cable plant that implements a FDX, there are several impedance mismatch points, such as, but not limited to, bad or rusted connectors, damaged cables, short connecting ports, or open connecting ports. When a signal passes through these mismatch points, echoes (or micro-reflections of the signal) may occur. An echo causes interference in signals and degrades the performance of signals. In an FDX system, an echo canceller is used in a node (or network element) to demodulate and decode an upstream signal correctly and cancel an echo from the downstream signal. However, typical echo cancellers cannot cancel an echo completely or accurately monitor a cable plant echo situation. With regard to echo monitoring, a pre-equalization coefficient can be used to detect an echo, how the estimated distance is the distance between two impedance mismatch points, not the distance from a node or cable mode. Therefore, using the pre-equalization coefficient requires the location of both impedance mismatch points, which are not always known. In addition, using the pre-equalization coefficient results in an interrogated strength of the two impedance mismatch points, and thus cannot detect a single echo.

Disclosed herein are methods and apparatuses for monitoring echoes and echo cancellation. In an embodiment, an echo monitoring and cancellation system is implemented in a cable node and is a multi-stage echo canceller. The echo monitoring and cancellation system includes at least two analog cancellers and at least one digital canceller to cancel one or more echoes, or undesired noise, from a signal. In an embodiment, the echo monitoring and cancellation system is capable of providing an echo channel estimate (or a summary of metrics of an echo) for a single FDX channel or a full FDX band upon request. The estimate can be a coefficient of each echo canceller or a response of the whole echo channel. In an embodiment, the echo monitoring and cancellation system also monitors a location, strength, and frequency response of each partial echo using the echo channel estimate coefficient.

The embodiments of echo monitoring and cancelling disclosed herein provide an estimated echo distance from the node to each echo point and the estimated echo strength is an absolute strength of each echo point (as opposed to an integrated strength of two impedance mismatch points). The embodiments of echo monitoring and cancellation disclosed herein also generate a summary of metrics for a single echo by isolating the single echo and analyzing the single echo. Thus, the embodiments of echo monitoring and cancellation disclosed herein do not require two impedance mismatch points.

The performance of current echo cancellers is limited. If the occurred echo is strong, it is difficult for the echo canceller to cancel the echo completely. In this situation, the un-cleaned echo will cause interference to the upstream signal and degrade the performance of upstream signal. An advantage of the disclosed embodiments include being able to capture and cancel at least 25 dB or more of a noise floor in an echo. In contrast, current echo cancellers can only capture and cancel approximately 0~5 dB of a noise floor in an echo.

Embodiments of the present disclosure perform echo cancellation in a coax cable plant based on a referenced echo canceller architecture using the relationship between echo canceller and echo channel. FIG. 1 is a schematic diagram illustrating a Full Duplex (FDX) Data over Cable Service Interface Specification (DOCSIS) system 100 in accordance with a disclosed embodiment. The FDX DOCSIS system 100 includes a FDX Node 110 located in a cable plant that provides cable services to consumers. The cable plant is receiving several echoes 114 occurring away from the FDX Node 110. The FDX Node 110 receives and transmits upstream signals (US) 102 and downstream signals (DS) 104 using the same spectrum at the same time to a plurality of cable modems (CMs) 106A-106F, doubling the efficiency of spectrum use. Each of the cable modems 106A-106F feed off a line tap 108A-108F. In one embodiment, the FDX Node 110 is configured to run the US signals 102 in the DS channels. To demodulate or decode the US signals 102 correctly, an echo canceller 112 is included in the FDX Node 110 to cancel the echo, in particular, the noise part from the DS signals 104. To keep upstream signal 102 in good condition, the FDX Node 110 is configured to monitor, locate, and cancel the occurrence of echoes 114.

The downstream signal 104 passes through a two-way splitter 103 and into a coaxial cable 101 or other transmission medium. As the downstream signal 104 travels downstream, it may encounter multiple taps 108 (108A-108F). As the downstream signal 104 travels downstream, it may be reflected to create an echo 114, and multiple echoes 114 may be created, as shown in the figure. The echo or echoes 114 travel back toward the FDX node 110 through the two-way splitter 103, along with an upstream signal or signals 102. The echo or echoes 114 are desirably removed before the upstream signal 102 is received and processed by the cable plant.

Figure 2:
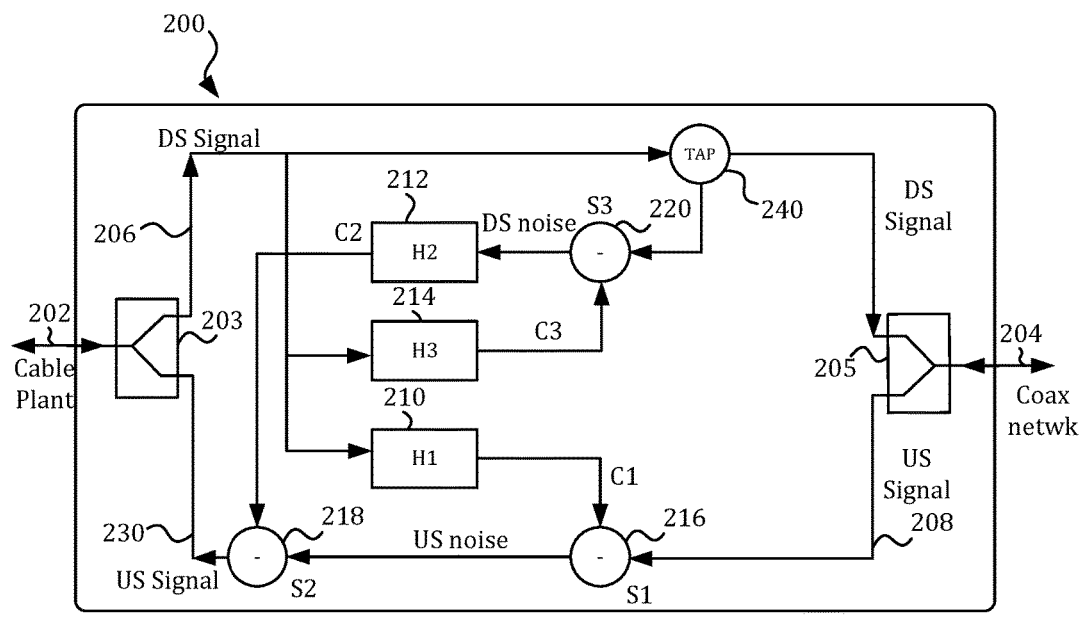
FIG. 2 is a schematic diagram illustrating an echo canceller in accordance with an embodiment of the present disclosure.

FIG. 2 is a schematic diagram illustrating an echo canceller 200 in accordance with a disclosed embodiment. The echo canceller 200 in some embodiments implements some or all components and/or functions of the echo canceller 112 of FIG. 1. The echo canceller 200 includes a first interface 202 and a second interface 204. The first interface 202 is communicatively coupled to a cable plant. The second interface 204 is communicatively coupled to the coaxial network. The first interface 202 is coupled to a first splitter 203 in the echo canceller 200, while the second interface 204 is coupled to a second splitter 205. The first splitter 203 receives signals from an upstream source via the first interface 202, such as from the cable plant, and provides signals internally as a downstream (DS) signal 206 inside the echo canceller 200. In addition, when the first splitter 203 receives the internal upstream (US) signal 230, the first splitter 203 provides the upstream (US) signal 230 at the first interface 202, from where it can be received by the cable plant or other upstream device. The second splitter 205 receives signals from a downstream source via the second interface 204, such as from a cable distribution network, and provides signals internally as a dirty upstream (US) signal 208. It should be understood that the dirty upstream (US) signal 208 may contain echoes, such as echoes including a downstream signal portion and a downstream noise portion. The first subtractor (S1) 216 and the second subtractor (S2) 218 cancel the downstream signal portion and the downstream noise portion of an echo of the downstream (DS) signal from the upstream signal (US) 230.

The echo signal is removed by the echo canceller 200. The echo canceller 200 is configured to cancel both the signal part and the noise part of an echo, and to cancel echoes at frequencies higher than current echo cancellers. In particular, the echo canceller 200 is configured to cancel an upstream echo signal received in the downstream signal. The echo signal includes a downstream signal portion and a downstream noise portion received back as part of the received dirty upstream (US) signal 208. Both the downstream signal portion and the downstream noise portion are removed from the dirty upstream (US) signal 208 to generate a clean, recovered upstream signal (US) 230 available at the first interface 202.

In the depicted embodiment, the echo canceller 200 includes a first echo canceller (H1) 210, a second echo canceller (H2) 212, a third echo canceller (H3) 214, a first subtractor (S1) 216, a second subtractor (S2) 218, and a third subtractor (S3) 220. The echo canceller 200 further includes a tap 240 that receives the downstream (DS) signal 206 from the first splitter 203. The tap 240 provides the downstream (DS) signal 206 to the third subtractor (S3) 220 and to the second splitter 205.

The first echo canceller (H1) 210 is coupled to the first splitter 203. The first echo canceller (H1) 210 is further coupled to an input of the first subtractor (S1) 216. The first echo canceller (H1) 210 receives the downstream (DS) signal 206 from the first splitter 203. The first echo canceller (H1) 210 produces a first cancellation signal (C1) from the downstream (DS) signal 206. In some embodiments, the first echo canceller (H1) 210 comprises a digital or analog filter.

The second echo canceller (H2) 212 is coupled to the third subtractor (S3) 220 and is further coupled to an input of the second subtractor (S2) 218. The second echo canceller (H2) 212 receives a downstream noise signal (DSnoise) from the third subtractor (S3) 220. The second echo canceller (H2) 212 produces a second cancellation signal (C2) from the downstream noise signal (DSnoise). An output of the second echo canceller (H2) 212 is provided to the second subtractor (S2) 218. The second cancellation signal (C2) will be used for canceling the downstream noise signal portion of the downstream echo signal. In some embodiments, the second echo canceller (H2) 212 comprises a digital or analog filter.

The third echo canceller (H3) 214 is coupled to the first splitter 203. The third echo canceller (H3) 214 is further coupled to an input of the third subtractor (S3) 220. The third echo canceller (H3) 214 receives the downstream (DS) signal 206. The third echo canceller (H3) 214 produces a third cancellation signal (C3) from the downstream (DS) signal 206. In some embodiments, the third echo canceller (H3) 214 comprises a digital or analog filter.

The first subtractor (S1) 216 receives the dirty upstream (US) signal 208 from the second splitter 205, and receives the first cancellation signal (C1) from the first echo canceller (H1) 210. The dirty upstream (US) signal 208 includes the upstream signal (US) 230 and the downstream echo signal. The first subtractor (S1) 216 removes the downstream signal portion of the downstream echo signal from the dirty upstream (US) signal 208, using the first cancellation signal (C1). The first subtractor (S1) 216 generates an upstream noise signal (USnoise) comprising the upstream signal (US) 230 and the downstream noise signal portion of the downstream echo signal.

The second subtractor (S2) 218 receives as inputs: 1) the second cancellation signal (C2) from the second echo canceller (H2) 212, and 2) the upstream noise (USnoise) signal from the first subtractor (S1) 216. The second subtractor (S2) 218 removes the downstream noise signal portion of the downstream echo signal from the upstream noise (USnoise) signal using the second cancellation signal (C2), thus removing both the downstream signal portion and the downstream noise signal portion of the downstream echo signal, wherein the echo signal is substantially entirely removed from the dirty upstream (US) signal 208 to produce the clean, recovered upstream (US) signal 230.

The third subtractor (S3) 220 receives as inputs: 1) the third cancellation signal (C3) from the third echo canceller (H3) 214, and 2) the downstream (DS) signal 206 from the tap 240. The third subtractor (S3) 220 is configured to remove the third cancellation signal (C3) from the downstream (DS) signal 206, producing a downstream noise signal (DSnoise). The downstream noise signal (DSnoise) comprises noise included in the downstream (DS) signal 206.

Figure 3:
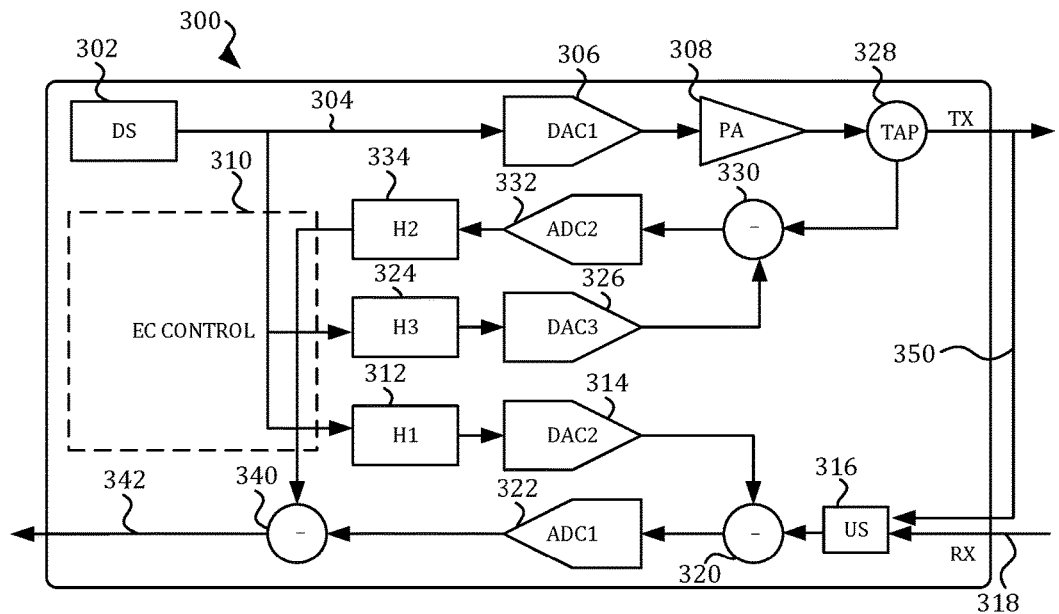
FIG. 3 is a schematic diagram illustrating an echo canceller in accordance with an embodiment of the present disclosure.

FIG. 3 is a schematic diagram illustrating an echo canceller 300 in accordance with a disclosed embodiment. The echo canceller 300 in some embodiments implements some or all components and/or functions of the echo canceller 112 of FIG. 1. The echo canceller 300 in some embodiments implements more functions than that of the echo canceller 112. The echo canceller 300 in some embodiments includes the components and functions disclosed in the echo canceller 200 of FIG. 2.

Similar to the echo canceller 300, the echo canceller 300 is configured to cancel both the signal part and the noise part in the echo at frequencies higher than current echo cancellers. For example, in 3200 to 3200 megahertz (MHz), the echo noise floor is about 36 decibel (dB) higher than the upstream noise floor. Current echo cancellers (which only can cancel 0~5 dB noise floor) are incapable of canceling the very high echo noise floor at higher frequencies. In contrast, the disclosed echo cancellers are able to cancel 30~36 dB noise at a high frequency (e.g., 2.2~3.2 GHz).

The echo canceller 300 in the embodiment shown includes a downstream interface 302 configured to receive a downstream digital signal and forward the downstream digital signal along a downstream signal path 304. A first digital-to-analog converter (DAC1) 306 is coupled to the downstream interface 302 via the downstream signal path 304. The DAC1 306 receives the downstream digital signal and converts the downstream digital signal to a downstream analog signal. A power amplifier (PA) 308 is coupled to the DAC1 306 and configured to receive the downstream analog signal. The PA 308 amplifies the downstream analog signal to generate an amplified downstream analog signal. The amplified downstream analog signal has a downstream analog signal component and a downstream analog noise signal component.

An echo canceller control (ECC) 310 is coupled to the downstream signal path and configured to receive the downstream analog signal. A first digital echo canceller (H1) 312 is coupled to the ECC 310 and configured to receive equalization estimate coefficients and the downstream analog signal from the ECC 310. The H1 312 produces a digital cancellation signal for canceling the downstream signal portion of a downstream echo signal 350 from a contaminated analog upstream signal. A second DAC (DAC2) 314 is coupled to the H1 312 and receives the digital cancellation signal from the DAC2 314. The DAC2 314 converts the first digital cancellation signal to a first analog cancellation signal for canceling the downstream signal portion of the downstream echo signal 350 from the first contaminated analog upstream signal. The first contaminated analog upstream signal includes an upstream signal component and the downstream echo signal 350.

The echo canceller 300 includes an upstream interface 316 that receives the first contaminated analog upstream signal and forwards the first contaminated analog upstream signal along an upstream signal path. The first contaminated analog upstream signal includes an upstream signal 318 and the downstream echo signal 350.

A first signal subtraction unit (S1) 320 along the upstream signal path receives the first contaminated analog upstream signal and the first analog cancellation signal. The S1 320 removes the downstream signal portion of the downstream echo signal 350 from the first contaminated analog upstream signal using the first analog cancellation signal. The S1 320 generates a second contaminated analog upstream signal that has the upstream signal and the downstream noise signal portion of the downstream echo signal 350.

A first analog-to-digital converter (ADC1) 322 along the upstream signal path receives the second contaminated analog upstream signal from the S1 320. The ADC1 322 converts the second contaminated analog upstream signal to a contaminated digital upstream signal that includes the upstream signal and the downstream noise signal portion of the downstream echo signal 350.

The echo canceller 300 also includes an analog echo canceller (H3) 324 coupled to the ECC 310. The H3 324 receives the equalization estimate coefficients and the downstream digital signal from the ECC 310. The H3 324 produces a third digital cancellation signal for canceling the downstream signal portion of the amplified downstream analog signal produced by the PA 308. A third DAC (DAC3) 326 coupled to H3 324 receives the third digital cancellation signal and converts the third digital cancellation signal to a third analog cancellation signal for canceling the downstream analog signal from the amplified downstream analog signal. A second signal subtraction unit (S2) 330 coupled to the DAC3 326 receives the amplified downstream analog signal from line tap 328 and the third analog cancellation signal from the DAC3 326. The S2 330 removes the downstream analog signal from the amplified downstream analog signal using the third analog cancellation signal to generate the downstream analog noise signal component.

A second ADC (ADC2) 332 coupled to the S2 330 receives the downstream analog noise signal and converts the downstream analog noise signal to a downstream digital noise signal. A second digital echo canceller (H2) 334 coupled to the ADC2 332 receives the downstream digital noise signal from the ADC2 332. The H2 334 generates a second digital cancellation signal for canceling the downstream noise signal portion of the downstream echo from the contaminated digital upstream signal.

The echo canceller 300 includes a third signal subtraction unit (S3) 340 coupled to the H2 334. The S3 340 receives the second digital cancellation signal and removes the downstream noise signal portion of the downstream echo from the contaminated digital upstream signal to generate a clean upstream signal 342 with the echo, both echo signal and echo noise, having been removed.

As described above, the ECC 310 trains the H1 312, and the DAC2 314 uses the downstream signal as a reference signal, through the H1 312 to generate a reverse signal to cancel the 'signal part in the echo' in the upstream using the S1 320 so that only the upstream signal together with 'noise part in echo' remains after the S1 320. To cancel the noise part in the echo in the upstream, a high quality reference noise is introduced because if the downstream is directly collected by the ADC2 332, the quality of noise in the downstream is very low due to most of the collected signal being the downstream signal and not the downstream noise. To get a high quality of downstream noise, the ECC 310 trains the H3 324, and the DAC3 326 uses the downstream signal as a reference signal through the H3 324 to generate a reverse signal to cancel the signal part in the downstream using the S2 330 leaving only the downstream noise. The ECC 310 trains the H2 334, and use the pure noise reference captured by ADC2 332 to cancel the noise part of the echo in the upstream collected by the ADC1 322, so that after the noise cancellation, the upstream will only have a high performance upstream signal.

Figure 4:
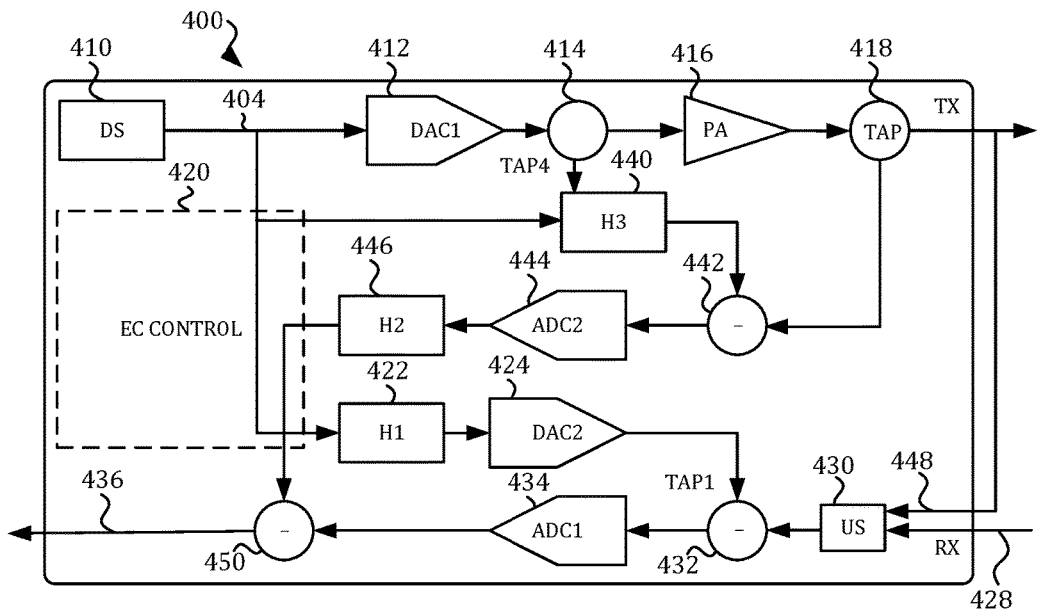
FIG. 4 is a schematic diagram illustrating an echo canceller in accordance with an embodiment of the present disclosure.

FIG. 4 is a schematic diagram illustrating an echo canceller 400 in accordance with another disclosed embodiment. Similar to the echo canceller 300, the echo canceller 400 is configured to cancel both the signal part and the noise part in the echo at frequencies higher than current echo cancellers. The echo canceller 400 uses an new analog canceller that adjusts the phase and magnitude of the downstream signal from a tap inserted after the downstream digital signal is converted to analog to cancel the signal part in the downstream reference signal so that an analog-to-digital converter just captures the noise part in the downstream as a noise reference to cancel the noise part in the echo.

In the depicted embodiment, the echo canceller 400 includes a downstream interface 410 configured to receive a downstream digital signal and forward the downstream digital signal along a downstream signal path 404. A first DAC (DAC1) 412 is coupled to the downstream interface 410 via the downstream signal path and receives the downstream digital signal. The DAC1 412 converts the downstream digital signal to a downstream analog signal. A PA 416 is coupled to the DAC1 412 and receives the downstream analog signal from the DAC1 412. The PA 416 amplifies the downstream analog signal to generate an amplified downstream analog signal. The amplified downstream analog signal includes a downstream analog signal component and a downstream analog noise signal component.

An ECC 420 is coupled to the downstream signal path and receives the downstream digital signal. A first digital echo canceller (H1) 422 is coupled to the ECC 420 and receives equalization estimate coefficients and the downstream digital signal from the ECC 420. The H1 422 produces a first digital cancellation signal for canceling the downstream signal portion of a downstream echo signal 448 from a first contaminated analog upstream signal. A second DAC (DAC2) 424 coupled to the H1 422 receives the first digital cancellation signal. The DAC2 234 converts the first digital cancellation signal to a first analog cancellation signal for canceling the downstream signal portion of the downstream echo signal 448 from the first contaminated analog upstream signal.

An upstream interface 430 receives the first contaminated analog upstream signal and forwards the first contaminated analog upstream signal along an upstream signal path. The first contaminated analog upstream signal includes an upstream signal component 428 and the downstream echo signal 448. A first signal subtraction unit (S1) 432 along the upstream signal path receives the first contaminated analog upstream signal and the first analog cancellation signal. The S1 432 removes the downstream signal portion of the downstream echo signal 448 from the first contaminated analog upstream signal using the first analog cancellation signal to generate a second contaminated analog upstream signal. The second contaminated analog upstream signal includes the upstream signal and the downstream noise signal portion of the downstream echo signal 448.

A first ADC (ADC1) 434 along the upstream signal path receives the second contaminated analog upstream signal. The ADC1 434 converts the second contaminated analog upstream signal to a contaminated digital upstream signal. The contaminated digital upstream signal includes the upstream signal and the downstream noise signal portion of the downstream echo signal 448.

An analog echo canceller (H3) 440 is coupled to the ECC 420 and receives the equalization estimate coefficients and the downstream analog signal. The H3 440 may adjust the phase and amplitude of the downstream signal from tap 414 to produce an analog downstream cancellation signal for canceling the downstream analog signal of the amplified downstream analog signal. A second signal subtraction unit (S2) 442 receives the amplified downstream analog signal from tap 418 and the analog downstream cancellation signal. The S2 442 removes the downstream analog signal from the amplified downstream analog signal using the analog downstream cancellation signal to generate the downstream analog noise signal.

A second ADC (ADC2) 444 is coupled to the S2 442. The ADC2 444 receives the downstream analog noise signal and converts the downstream analog noise signal to a downstream digital noise signal. A second digital echo canceller (H2) 446 is coupled to the ADC2 444. The H2 446 receives the downstream digital noise signal from the ADC2 444. The H2 446 produces a second digital cancellation signal for canceling the downstream noise signal portion of the downstream echo from the contaminated digital upstream signal.

A third signal subtraction unit (S3) 450 is coupled to the H2 446. The S3 450 receives the second digital cancellation signal from the H2 446, and the contaminated digital upstream signal from the ADC1 434. The S3 450 removes the downstream noise signal portion of the downstream echo from the contaminated digital upstream signal using the second digital cancellation signal to generate a clean upstream signal 436 with the echo, both echo signal and echo noise, having been removed.

Figure 5:
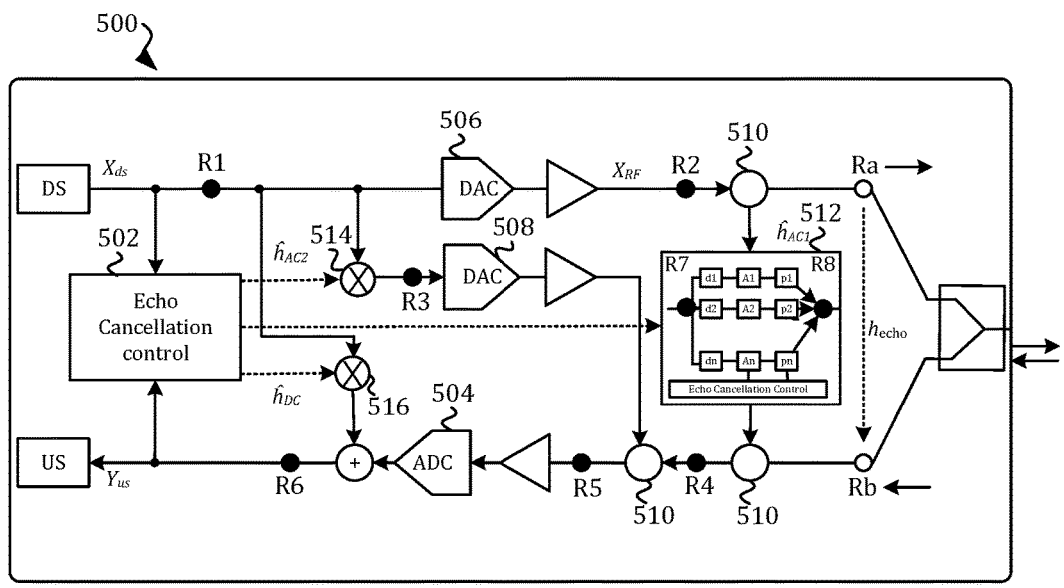
FIG. 5 is a schematic diagram illustrating an echo monitoring and cancellation system in accordance with an embodiment of the present disclosure.

FIG. 5 illustrates an embodiment of an echo monitoring and cancellation system 500. As shown in FIG. 5, the echo monitoring and cancellation system 500 comprises, among other components, an echo cancellation control component 502, a plurality of reference points (R1, R2, R3, Ra, Rb, Re, R4, R5, and R6), an analog to digital converter (ADC) 504, two digital-to-analog converters (DACs) 506, 508 and a plurality of taps or splitters 510s. Thus, the echo monitoring and cancellation system 500 includes an analog canceller with multiple DACs and digital cancellation. In an embodiment, the echo monitoring and cancellation system 500 provides an architecture with a first analog canceller 512 (A-echo canceller (EC)#1) that is used to cancel floor noise in a node output echo and may also cancel a first tap echo. The architecture may also include a second analog canceller 514 (A-EC#2) that is mainly used to cancel the other echoes enough so that the ADC 504 does not saturate the signal. The architecture may also include a digital canceller 516 (D-EC) that is used to cancel the residual echo, which was not cancelled by A-EC#1 512 and A-EC#2. Therefore, the echo monitoring and cancellation system 500 shown in FIG. 5 has three layers of echo cancellation. Although only two analog cancellers and one D-EC are shown in FIG. 5, it should be appreciated that any number of analog cancellers and D-ECs may be used in an echo monitoring and cancellation system 500.

There are a series of filter coefficients in each designed canceller. The echo cancellation control component 502 may estimate those coefficients to filter or cancel the echo. For example, the A-EC#1 512 may include a series of delay lines (Dns) with different amplitudes (An) and phases (Pn). The filter response of A-EC#1 512 can be defined as HAC1 (or ĥAC1 in the figure). The filter response of A-EC#2 514 can be defined as HAC2 (or ĥAC2 in the figure). The filter response of D-EC 516 can be defined as HDC (or FDC in the figure). The analog cancellers and the D-ECs can each be implemented in time domain or frequency domain. The filter response can be in time domain (called impulse response) or frequency domain (called frequency response).

The response of the echo channel can be defined as HECHO. In an embodiment, A-EC#1 512 uses HAC1 to cancel the node output echo and possibly the first tap echo according to the following equation (1):

$$HR2Ra*HECHOAC1*HRbR4+HR2R7*HAC1*HR8R4=0 \quad (1)$$

Where HECHOAC1 is the response of echo channel which part has canceled by the A-EC#1 512, HR2Ra is the response that affects downstream signal xRF when passing through the component from reference point R2 to Ra, HRbR4 is the response that affects signal when passing through the component from reference point Rb to R4, HR2R7 is the response that affects downstream signal xRF when passing through the component from reference point R2 to R7, HAC1 is the filter response of A-EC#1 512, and HR8R4 is the response that affects downstream signal xRF when passing through the component from reference point R8 to R4. For a fixed node system, the characteristic of the each component is fixed, so that through this expression the relationship between HECHOAC1 and HAC1 can be calculated. Simply, the characteristic of each component can be treated as a constant value, so the expression can be simplified as equation (2):

$$HECHOAC1=C1*HAC1 \quad (2)$$

Where HECHOAC1 is the response of echo channel which part has canceled by the A-EC#1 512, HAC1 is the filter response of A-EC#1 512, and C1 is a constant which depends on the characteristic of the component in the node.

In an embodiment and using the same analytical method, A-EC#2 uses HAC2 to cancel other echoes according to the following equation (3):

$$HR1Ra*HECHOAC2*HRbR5+HAC2*HR3R5=0 \quad (3)$$

Where HECHOAC2 is the response of echo channel which part has canceled by the A-EC#2, HR1Ra is the response that affects downstream signal xRF when passing through the component from reference point R1 to Ra, HRbR5 is the response that affects downstream signal xRF when passing through the component from reference point Rb to R5, HR3R5 is the response that affects downstream signal xRF when passing through the component from reference point R3 to R5, and HAC2 is the filter response of A-EC#2. For a fixed node system, the characteristic of the each component is fixed, so that through this expression the relationship between HECHOAC2 and HAC2 can be calculated. Simply, the characteristic of each component can be treated as a constant value, so the expression can be simplified as equation (4):

$$HECHOAC2=C2*HAC2 \quad (4)$$

Where HECHOAC2 is the response of echo channel which part has canceled by the A-EC#2, HAC2 is the filter response of A-EC#2, and C2 is a constant which depends on the characteristic of the component in the node.

In an embodiment, the D-EC uses the HDC to cancel the residual echo that was not cancelled by A-EC#1 512 and A-EC#2 according to the following equation (5):

$$HR1Ra*HECHODC*HRbR6+HDC=0 \quad (5)$$

Where HECHODC is the response of echo channel which part has canceled by the D-EC, HR1Ra is the response that affects downstream signal xRF when passing through the component from reference point R1 to Ra, HRbR6 is the response that affects downstream signal xRF when passing through the component from reference point Rb to R6, and HDC is the filter response of D-EC. For a fixed node system, the characteristic of the each component is fixed, so that through this expression the relationship between HECHODC and HDC can be calculated. Simply, the characteristic of each component can be treated as a constant value, so the expression can be simplified as equation (6):

$$HECHODC=C3*HDC \quad (6)$$

Where HECHODC is the response of echo channel which part has canceled by the D-EC, HDC is the filter response of D-EC, and C3 is a constant which depends on the characteristic of the component in the node.

For the whole system, all three cancellers are applied together to cancel the echo. So the relationship between cancellers (HAC1, HAC2, HDC) and whole echo channel response HECHO can be expressed as equation (7):

$$HR1R7*HAC1*HR8R6+HAC2*HR3R6+HDC+HR1Ra*HECHO*HRbR6=0 \quad (7)$$

Where HR1R7 is the response that affects downstream signal xRF when passing through the component from reference point R1 to R7, HAC1 is the filter response of A-EC#1 512, HR8R6 is the response that affects downstream signal xRF when passing through the component from reference point R8 to R6, HAC2 is the filter response of A-EC#2, HR3R6 is the response that affects downstream signal xRF when passing through the component from reference point R3 to R6, HDC is the filter response of D-EC, HR1Ra is the response that affects downstream signal xRF when passing through the component from reference point R1 to Ra, HECHO is the whole echo channel response, and HRbR6 is the response that affects downstream signal xRF when passing through the component from reference point Rb to R6. The calculation of HECHO can thus be simplified as equation (8):

$$HECHO = HECHOAC1 + HECHOAC2 + HECHODC = 1*HAC1 + C2*HAC2 + C3*HDC \quad (8)$$

Equations (1) to (8) can be used by the echo cancellation control component 502 to monitor the echo and cancel the echo in the echo monitoring and cancellation system 500 of FIG. 5.

Figure 6:
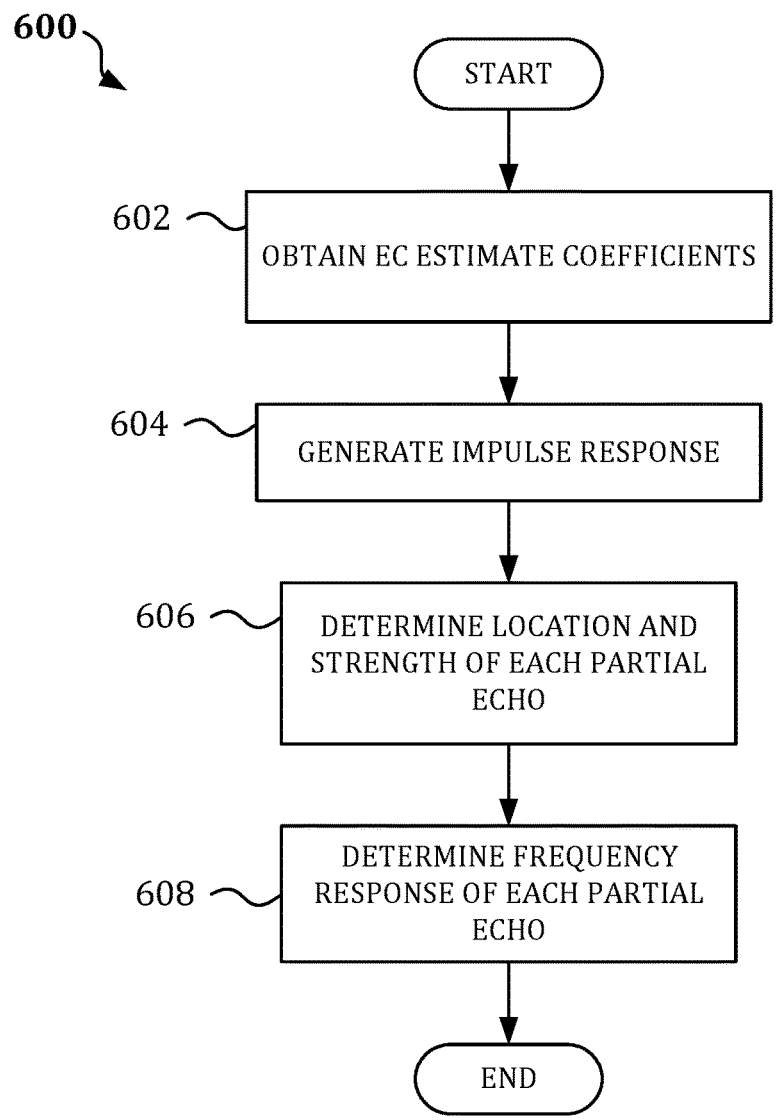
FIG. 6 is a flowchart illustrating an echo monitoring method in accordance with an embodiment of the present disclosure.

FIG. 6 is a flowchart illustrating an echo monitoring method 600 in accordance with a disclosed embodiment. The method 600 may be performed by a network management system. The method 600 begins at step 602 by obtaining EC estimate coefficients from a cable node. The cable node may provide the EC estimate coefficient or response of EC for any single FDX channel or the full FDX band upon request or on demand. The EC estimate coefficients may be the coefficient of each echo canceller module or the response of the whole echo channel. In certain embodiments, to avoid having to send all coefficients on every query, a summary metrics data can be calculated by the node. For example, summary metrics data performed by echo monitors may include time delay, location, strength of each echo; or the maximum, mean, median, standard deviation for both the amplitude (or its envelope) and group delay of frequency response.

At step 604, the method 600 generates an impulse response. In some embodiments, if the obtained EC estimate coefficients are not in a time domain impulse response, the method 600 transforms the EC estimate coefficients from frequency domain (frequency response) to time domain using IDFT or IFFT to generate the impulse response.

At step 606, the method 600 determines a location and strength of each partial echo in the impulse response. In one embodiment, the location and strength of each partial echo is calculated by finding the local peak from the amplitude of impulse response. The distance D from the node to echo location is D=v*t/2, where v is the propagation velocity of signal in cable, t is the time delay of the echo, and the time value of the local peak. The strength of each echo is the magnitude value of the local peak, or may be obtained by adding the effect of each component in the node. In some embodiments, a threshold curve may be set to monitor the echo situation.

At step 608, the method 600 determines a frequency response of each partial echo. In one embodiment, the frequency response of each partial echo is determined by adding a window to each echo peak in the impulse response to select the partial echo in the impulse response and then transforming each partial echo impulse response into frequency response by a Discrete Fourier Transform (DFT) or a Fast Fourier Transform (FFT).

Figure 7:
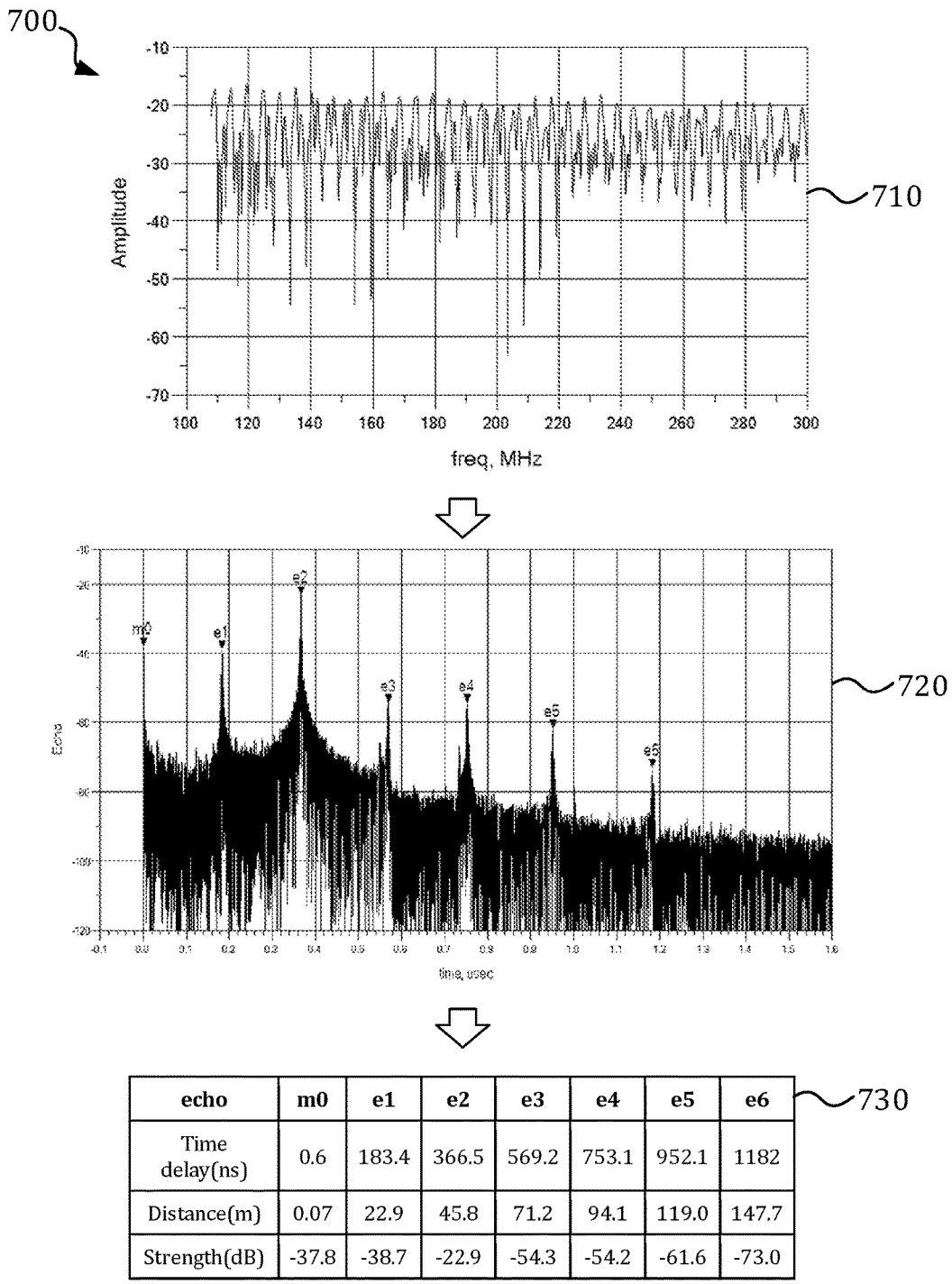
FIG. 7 is a diagram illustrating a method for calculating the location and strength of each partial echo in accordance with an embodiment of the present disclosure.

FIG. 7 provides an example illustration of a process 700 for calculating the location and strength of each partial echo in accordance with an embodiment. The process 700 begins with graph 710 that depicts the echo channel estimate coefficient in the frequency domain. In the depicted embodiment, the process 700 transforms the echo channel estimate coefficients from the frequency domain to the time domain using IFFT to generate the graph 720, which depicts echo channel estimate coefficient in the time domain. As shown in graph 720, there are about 7 echoes (m0, e1, e2, e3, e4, e5, and e6) in the cable plant. The velocity of signal in the cable is about v=2.5e8 m/s, so the location and strength of each echo can be calculated as illustrated in chart 730.

Figure 8:
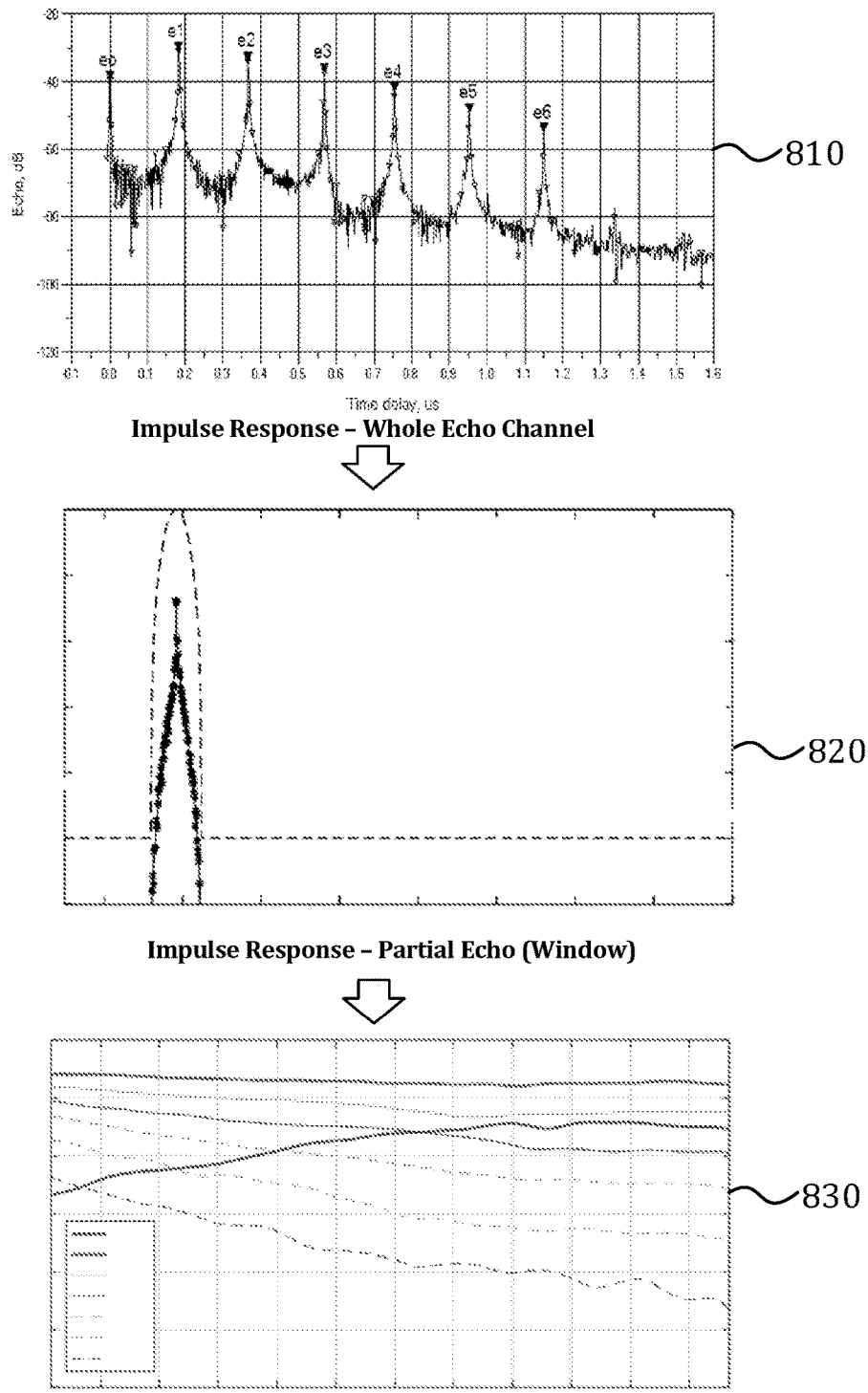
FIG. 8 is a diagram illustrating a method for calculating the frequency response of each partial echo in accordance with an embodiment of the present disclosure.

FIG. 8 provides an example illustration of a process 800 for calculating the frequency response of each partial echo in accordance with an embodiment. The process 800 begins with graph 810 that depicts the whole echo channel impulse response in the time domain. As shown in graph 810, there are about 7 partial echoes (e0-e6) in the cable plant. The partial echo may be used to monitor the detail of echo situation and noise floor from each line tap (e.g., line tap 108A-108F shown in FIG. 1). The partial echo may be calculated from the impulse response of the echo channel by adding a window to each echo peak in the impulse response to select the partial echo in the impulse response as illustrated in graph 820. A window function is a mathematical function that is zero-valued outside of some chosen interval. Various window functions may be used including Hamming, Hann, Blackman, Rectangle, etc. After windowing, the process 800 transforms each partial echo impulse response into a frequency response using DFT or FFT as illustrated in graph 830.

Figure 9:
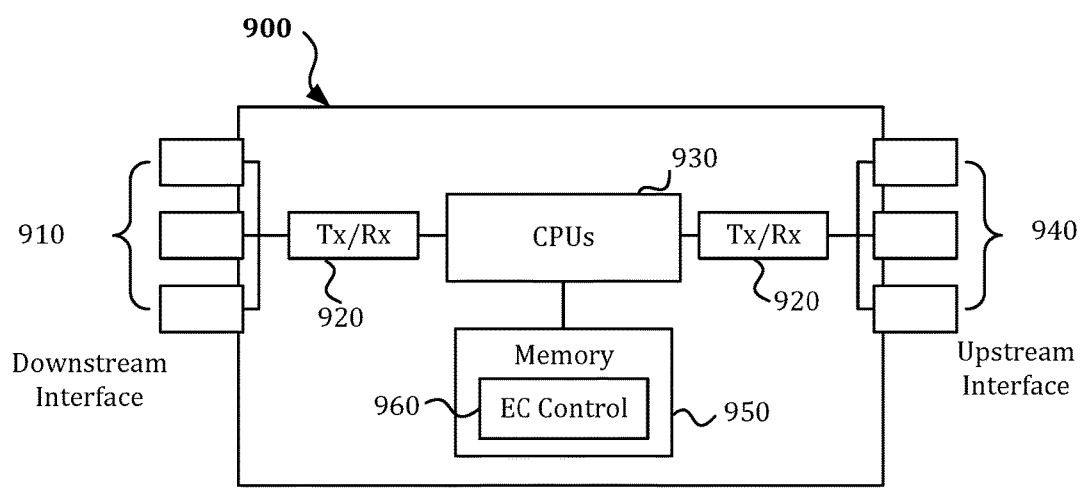
FIG. 9 is a schematic diagram of an apparatus in accordance with an embodiment of the present disclosure.

FIG. 9 is a schematic diagram of an apparatus 900 configured to implement one or more of the methods disclosed herein according to an embodiment of the disclosure. For example, the apparatus 900 may represent a network management system that performs the method 400. The apparatus 900 comprises a downstream interface 910; an upstream interface 940; one or more transceiver units (Tx/Rx) 920 coupled to the downstream interface 910; one or more processors, logic units, or central processing units (CPUs) 930 coupled to the one or more transceiver units 920; and a memory 950 coupled to the one or more processors 930.

The CPUs 930 are implemented by any suitable combination of hardware, middleware, and/or firmware. The CPUs 930 may be implemented as one or more CPU chips, cores (e.g. as a multi-core processor), field-programmable gate arrays (FPGAs), application specific integrated circuits (ASICs), or digital signal processors (DSPs). The CPUs 930 are in communication with the downstream interface 910, Tx/Rx 920, upstream interface 940, and memory 950.

The memory 950 comprises one or more disks, tape drives, or solid-state drives and may be used as an over-flow data storage device, to store programs when such programs are selected for execution, or to store instructions and data that are read during program execution. The memory 950 may be volatile and/or non-volatile and may be read-only memory (ROM), random-access memory (RAM), ternary content-addressable memory (TCAM), or static random-access memory (SRAM). In one embodiment, the memory 950 stores an echo channel control module 960. The echo channel control module 960 comprises executable instructions and data configurations for implementing the disclosed embodiments as described herein when executed by the CPUs 930.

Accordingly, the disclosed embodiments provide various methods for monitoring echoes in a coaxial cable plant and various embodiments of an echo canceller. An advantage of the disclosed embodiments include being able to capture and cancel at least 25 dB or more of a noise floor in the echo. In contrast, current echo cancellers can only capture and cancel 0~5 dB noise floor in the echo because the downstream signal is directly captured by an ADC. Thus, in current echo cancellers the noise floor part in the captured downstream signal is only 0~5 dB, the rest of the captured downstream signal is the signal. Therefore, current echo cancellers can only be used in a low frequency or frequency range, such as 108~684 MHz for canceling the noise floor in the echo. If there is a serious echo in the plant, the current echo canceller ability is limited, and the upstream performance is low. In contrast to current echo cancellers, the disclosed embodiments cancels the signal part in the downstream using a DAC (as shown in FIG. 3) or a new analog canceller (as shown in FIG. 4), so the noise captured by the ADC will be pure and can be used as noise floor reference signal to cancel serious noise floor in the echo. Thus, even if there is serious echo in the cable plant, the disclosed embodiments are able to provide high upstream performance. Other advantages of the disclosed embodiments may also be recognized by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method performed by a node for monitoring echoes in a coaxial cable plant, the method comprising:
    obtaining echo channel (EC) estimate coefficients;
    determining a location and strength of each partial echo in an impulse response using the EC estimate coefficients;
    determining a frequency response of each partial echo in the impulse response;
    determining a local peak from an amplitude of the impulse response; and
    wherein determining the location of each partial echo in the impulse response comprises determining a distance D from the node to an echo location using equation $D=v*t/2$, where v is a propagation velocity of signal in a cable; t is a time delay of the partial echo and is equal to a time value of the local peak from the amplitude of the impulse response.

2. The method of claim 1, further comprising transforming the EC estimate coefficients from a frequency domain to a time domain to generate the impulse response.

3. The method of claim 2, wherein transforming the EC estimate coefficients from the frequency domain to the time domain to generate the impulse response is performed using Inverse Discrete Fourier Transform (IDFT).

4. The method of claim 2, wherein transforming the EC estimate coefficients from the frequency domain to the time domain to generate the impulse response is performed using Inverse Fast Fourier Transform (IFFT).

5. The method of claim 1, wherein the strength of each partial echo in the impulse response is a magnitude value of the local peak.

6. The method of claim 1, wherein the strength of each partial echo in the impulse response is determined by adding an effect of each component in the node.

7. The method of claim 1, wherein determining the frequency response of each partial echo in the impulse response comprises:
    adding a window to each local peak in the impulse response to select the partial echo in the impulse response; and
    transforming each of the partial echoes in the impulse response into the frequency response.

8. An echo canceller configured to cancel a downstream echo signal from an upstream signal received by the echo canceller, the downstream echo signal comprising a downstream signal portion and a downstream noise signal portion, the echo canceller comprising:
    a first echo canceller configured to receive a downstream signal received by the echo canceller and produce a first cancellation signal from the downstream signal;
    a first subtractor configured to receive the first cancellation signal and a contaminated upstream signal, the contaminated upstream signal comprising an upstream signal and the downstream echo signal, the first subtractor configured to remove the downstream signal portion of the downstream echo signal from the upstream signal using the first cancellation signal, generating an upstream noise signal comprising the upstream signal and the downstream noise signal portion of the downstream echo signal;
    a third echo canceller configured to receive the downstream signal received by the echo canceller, the third echo canceller configured to produce a third cancellation signal from the downstream signal;
    a third subtractor configured to receive the third cancellation signal and a contaminated downstream signal that includes the downstream signal and a downstream noise signal, the third subtractor configured to remove the downstream signal from the contaminated downstream signal using the third cancellation signal, generating a downstream noise signal;
a second echo canceller configured to receive the downstream noise signal, the second echo canceller configured to produce a second cancellation signal from the downstream noise signal for canceling the downstream noise signal portion of the downstream echo signal; and
a second subtractor configured to receive the second cancellation signal from the second echo canceller and receive the upstream noise signal, the second subtractor configured to remove the downstream noise signal portion of the downstream echo signal from the upstream noise signal using the second cancellation signal to produce the upstream signal.

9. The echo canceller of claim 8, further comprising a first digital-to-analog converter coupled to a power amplifier (PA), the power amplifier coupled to the third subtractor for providing the downstream signal to the third subtractor, wherein the first digital-to-analog converter is configured to convert the downstream signal to an analog signal, and the power amplifier is configured to amplify the downstream signal to generate the contaminated downstream signal.

10. The echo canceller of claim 8, further comprising an analog-to-digital converter coupled between the first subtractor and the second subtractor, the analog-to-digital converter configured to convert the upstream noise signal to a digital signal.

11. The echo canceller of claim 8, further comprising a digital-to-analog converter coupled between the first echo canceller and the first subtractor, the digital-to-analog converter configured to convert the first cancellation signal to a digital signal.

12. The echo canceller of claim 8, further comprising a digital-to-analog converter coupled between the third echo canceller and the third subtractor, the digital-to-analog converter configured to convert the third cancellation signal to a digital signal.

13. The echo canceller of claim 8, further comprising an analog-to-digital converter coupled between the third subtractor and the second echo canceller, the analog-to-digital converter configured to convert the downstream noise signal to a digital signal.

14. An echo canceller configured to cancel a downstream echo signal from a contaminated upstream signal, the echo canceller comprising:
a downstream noise canceling circuit path comprising a first digital-to-analog converter (DAC1), a first signal subtraction unit (S1), and a first analog-to-digital converter (ADC1), the DAC1 configured to generate an analog downstream signal, the S1 configured to subtract the analog downstream signal from a downstream reference signal to generate an analog downstream noise signal, and the ADC1 configured to convert the analog downstream noise signal to a digital downstream noise signal.

15. The echo canceller of claim 14, further comprising:
a downstream signal canceling circuit path comprising a second digital-to-analog converter (DAC2), a second signal subtraction unit (S2), a second analog-to-digital converter (ADC2), and a third signal subtraction unit (S3).

16. The echo canceller of claim 15, wherein the DAC2 is configured to generate a second analog downstream signal.

17. The echo canceller of claim 16, wherein the S2 is configured to remove a downstream signal portion of a downstream echo signal from a first contaminated analog upstream signal using the second analog downstream signal to generate a second contaminated analog upstream signal comprising an upstream signal and a downstream noise signal portion of a downstream echo signal.

18. The echo canceller of claim 17, wherein the ADC2 is configured to convert the second contaminated analog upstream signal to a contaminated digital upstream signal, the contaminated digital upstream signal comprising the upstream signal and the downstream noise signal portion of the downstream echo signal.

19. The echo canceller of claim 18, wherein the S3 is configured to receive the digital downstream noise signal and the contaminated digital upstream signal, the S3 further configured to remove the downstream noise signal portion of the downstream echo signal from the contaminated digital upstream signal using the digital downstream noise signal to generate the upstream signal.

20. An echo canceller configured to cancel a downstream echo signal from a contaminated upstream signal, the echo canceller comprising:
a downstream noise canceling circuit path comprising an analog echo canceller (H3), a first signal subtraction unit (S1), and a first analog-to-digital converter (ADC1), the H3 configured to produce an analog downstream cancellation signal for canceling a downstream analog signal from a downstream reference signal, the downstream reference signal comprising the downstream reference signal and a downstream noise signal, the S1 configured to receive the downstream reference signal and the analog downstream cancellation signal, the S1 configured to remove the downstream analog signal from the downstream reference signal using the analog downstream cancellation signal to generate a downstream analog noise cancellation signal, the ADC1 configured to convert the downstream analog noise cancellation signal to a downstream digital noise cancellation signal.

21. The echo canceller of claim 20, further comprising:
a downstream signal canceling circuit path comprising a digital-to-analog converter (DAC), a second signal subtraction unit (S2), a second analog-to-digital converter (ADC2), and a third signal subtraction unit (S3).

22. The echo canceller of claim 21, wherein the DAC is configured to generate a second analog downstream cancellation signal for canceling the downstream analog signal from a first contaminated analog upstream signal comprising an upstream signal and the downstream echo signal, the S2 configured to remove a downstream signal portion of the downstream echo signal from the first contaminated analog upstream signal using the second analog downstream cancellation signal to generate a second contaminated analog upstream signal comprising the upstream signal and a downstream noise signal portion of the downstream echo signal, the ADC2 configured to convert the second contaminated analog upstream signal to a contaminated digital upstream signal, the contaminated digital upstream signal comprising the upstream signal and the downstream noise signal portion of the downstream echo signal.

23. The echo canceller of claim 22, wherein the S3 is configured to receive the downstream digital noise cancellation signal and the contaminated digital upstream signal, the S3 further configured to remove the downstream noise signal portion of the downstream echo signal from the contaminated digital upstream signal using the downstream digital noise cancellation signal to generate the upstream signal.

\* \* \* \* \*